(12) United States Patent
Street

(10) Patent No.: US 8,922,565 B2
(45) Date of Patent: Dec. 30, 2014

(54) SYSTEM AND METHOD FOR USING A SECONDARY PROCESSOR IN A GRAPHICS SYSTEM

(75) Inventor: Michael D. Street, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1184 days.

(21) Appl. No.: 11/948,710

(22) Filed: Nov. 30, 2007

(65) Prior Publication Data

US 2009/0141033 A1  Jun. 4, 2009

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01)
USPC ........... 345/506; 345/419; 345/505; 345/426; 345/522; 345/585; 345/619; 345/531; 708/204; 708/495; 711/129; 711/122; 711/137; 711/213; 711/136

(58) Field of Classification Search
USPC ............... 345/419–628; 358/1.16, 1.15, 1.13; 708/204, 495; 711/129, 122, 137, 213, 711/136, 173
See application file for complete search history.

(56) References Cited

U.S. PATENT DOCUMENTS

| | | | | |
|---|---|---|---|---|
| 4,866,637 | A | * | 9/1989 | Gonzalez-Lopez et al. ... 345/426 |
| 5,764,228 | A | * | 6/1998 | Baldwin ........................ 715/797 |
| 5,798,770 | A | * | 8/1998 | Baldwin ........................ 345/506 |
| 5,841,444 | A | * | 11/1998 | Mun et al. ...................... 345/506 |
| 6,191,800 | B1 | * | 2/2001 | Arenburg et al. ............. 345/505 |
| 6,347,344 | B1 | | 2/2002 | Baker et al. |
| 6,469,746 | B1 | * | 10/2002 | Maida ........................... 348/564 |
| 6,545,679 | B1 | | 4/2003 | Hussain et al. |
| 6,570,571 | B1 | * | 5/2003 | Morozumi ..................... 345/505 |
| 6,771,269 | B1 | * | 8/2004 | Radecki et al. ............... 345/503 |
| 6,919,896 | B2 | * | 7/2005 | Sasaki et al. .................. 345/505 |
| 6,956,579 | B1 | * | 10/2005 | Diard et al. ................... 345/537 |
| 6,972,769 | B1 | * | 12/2005 | Nebeker et al. ............... 345/552 |

(Continued)

FOREIGN PATENT DOCUMENTS

EP  1594091 A2  11/2005
JP  2002132489 A  5/2002

(Continued)

OTHER PUBLICATIONS

European Search Report—EP08006421—Search Authority—Munich—Mar. 6, 2009.

(Continued)

*Primary Examiner* — Abderrahim Merouan
(74) *Attorney, Agent, or Firm* — James R. Gambale, Jr.

(57) ABSTRACT

A system, method and apparatus are disclosed, in which a processing unit is configured to perform secondary processing on graphics pipeline data outside the graphics pipeline, with the output from the secondary processing being integrated into the graphics pipeline so that it is made available to the graphics pipeline. A determination is made whether to use secondary processing, and in a case that secondary processing is to be used, a command stream, which can comprise one or more commands, is provided to the secondary processing unit, so that the unit can locate and operate on buffered graphics pipeline data. Secondary processing is managed and monitored so as to synchronize data access by the secondary processing unit with the graphics pipeline processing modules.

21 Claims, 10 Drawing Sheets

(56) References Cited

U.S. PATENT DOCUMENTS

| | | | |
|---|---|---|---|
| 6,985,152 B2* | 1/2006 | Rubinstein et al. | 345/520 |
| 2004/0075623 A1* | 4/2004 | Hartman | 345/1.3 |
| 2004/0222994 A1* | 11/2004 | Sadowski et al. | 345/506 |
| 2005/0041031 A1* | 2/2005 | Diard | 345/505 |
| 2005/0138328 A1* | 6/2005 | Moy et al. | 712/205 |
| 2005/0210172 A1 | 9/2005 | Gruber et al. | |
| 2005/0280654 A1* | 12/2005 | Boyd et al. | 345/559 |
| 2007/0091088 A1* | 4/2007 | Jiao et al. | 345/426 |
| 2007/0091089 A1* | 4/2007 | Jiao et al. | 345/426 |
| 2007/0139423 A1* | 6/2007 | Kong et al. | 345/502 |
| 2007/0165043 A1* | 7/2007 | Fouladi et al. | 345/558 |
| 2008/0007559 A1* | 1/2008 | Kalaiah et al. | 345/501 |
| 2009/0251476 A1* | 10/2009 | Jiao et al. | 345/543 |

FOREIGN PATENT DOCUMENTS

| | | | |
|---|---|---|---|
| JP | 2002527824 A | 8/2002 | |
| JP | 2003067758 A | 3/2003 | |
| JP | 2005182825 A | 7/2005 | |
| JP | 2005322224 A | 11/2005 | |
| JP | 2007503059 A | 2/2007 | |
| WO | WO2006034034 A2 | 3/2006 | |

OTHER PUBLICATIONS

International Search Report and Written Opinion—PCT/US2008/084868—ISA/EPO—Mar. 17, 2009.

Shilov Anton, "NVIDIA's Graphics Cards to Take Advantage of Multi-Core Chips", Jun. 11, 2005, pages 1-2, URL: http://www.xbitlabs.com/news/video/display/20050620133439.html, XP002554367.

Taiwan Search Report—TW097146520—TIPO—Apr. 5, 2012.

* cited by examiner

SYSTEM AND METHOD FOR USING A SECONDARY PROCESSOR IN A GRAPHICS SYSTEM

TECHNICAL FIELD

This disclosure relates to parallel processing in a graphic processing system, and more particularly synchronizing use of a secondary processor in connection with other processing units, such as a central processing unit and a graphics processing unit, to perform graphics processing in parallel, including reintegration of data processed by such a secondary processor into a graphics processing pipeline.

BACKGROUND DISCUSSION

A graphics processing unit (GPU) is a dedicated graphics rendering device used to generate computerized graphics for display on a display device. A GPU is typically used with a general purpose central processing unit (CPU) to process graphic image data, e.g., three-dimensional computerized graphic image data. In such a case, a GPU can implement a number of primitive graphics operations to create three-dimensional images for display on a display device more quickly than using a CPU to draw the image for display on the display device. Typically, a GPU includes hardware that implements some number of the complex algorithms in hardware.

A typical GPU receives an image geometry and uses a pipeline approach to generate graphics which can be output, for example, for display on a display device. A typical graphics pipeline includes a number of stages which operate in parallel, with the output from one stage possibly being used at another stage in the pipeline. For example, a typical graphics pipeline comprises vertex shader, primitive assembly, viewport transformation, primitive setup, rasterization, hidden primitive and pixel rejection, attribute setup, attribute interpolation and fragment shader stages.

A vertex shader is applied to the image geometry for an image and generates vertex coordinates and attributes of vertices within the image geometry. Vertex attributes include, for example, color, normal, and texture coordinates associated with a vertex. Primitive assembly forms primitives, e.g., point, line, and triangle primitives, from the vertices based on the image geometry. Formed primitives can be transformed from one space to another using a transformation, e.g., a viewport transformation which transforms primitives from a normalized device space to a screen space. Primitive setup can be used to determine a primitive's area, edge coefficients, and perform occlusion culling (e.g., backface culling), and 3-D clipping operations.

Rasterization converts primitives into pixels based on the XY coordinates of vertices within the primitives and the number of pixels included in the primitives. Hidden primitive and pixel rejection use the z coordinate of the primitives and/or pixels to determine and reject those primitives and pixels determined to be hidden (e.g., a primitive or pixel located behind another primitive or pixel in the image frame, a transparent primitive or pixel). Attribute setup determines attribute gradients, e.g., a difference between the attribute value at a first pixel and the attribute value at a second pixel within a primitive moving in either a horizontal (X) direction or a vertical (Y) direction, for attributes associated with pixels within a primitive. Attribute interpolation interpolates the attributes over the pixels within a primitive based on the determined attribute gradient values. Interpolated attribute values are sent to the fragment shader for pixel rendering. Results of the fragment shader can be output to a post-processing block and a frame buffer for presentation of the processed image on the display device.

It is beneficial to facilitate the graphics pipeline processing to achieve increased throughput. Efforts have been made to increase throughput by optimizing software that implements a portion of the graphics pipeline. However, such an approach is costly, since it typically requires significant programmer effort and time to generate the optimized program code. Increased throughput might be achieved using dedicated hardware. However, such an approach involves additional cost for the dedicated hardware, which hardware is only available to be used for a dedicated purpose.

SUMMARY

The present disclosure seeks to address failings in the art and to provide efficiencies in graphics image processing to use a secondary processing unit to perform graphics processing in a graphics processing pipeline to supplement the processing performed by other processing units, such as a graphics processing unit and/or a central processing unit, to identify a data dependency associated with such processing and integrate output generated by the secondary processing unit into the graphics processing pipeline to satisfy such data dependency.

A system, method and apparatus are disclosed, in which a processing unit is configured to perform secondary processing on graphics pipeline data outside the graphics pipeline, with the output from the secondary processing being integrated into the graphics pipeline so that it is made available to the graphics pipeline. A determination is made whether to use secondary processing, and in a case that secondary processing is to be used, a command stream, which can comprise one or more commands, is provided to the secondary processing unit, so that the unit can locate and operate on buffered graphics pipeline data. Secondary processing is managed and monitored so as to synchronize data access by the secondary processing and one or more processing modules in the graphics pipeline.

In accordance with embodiments of the present disclosure, an opportunity to use a secondary processing unit, or secondary processor, with a graphics processing pipeline is identified, and graphics pipeline data is made available to the secondary processing unit. Graphics pipeline data generated by the secondary processing unit is reintegrated into the graphics pipeline. By way of a non-limiting example, the secondary processor is a digital signal processor, which is configured as a lighting module to generate lit colors from color data made available to the digital signal processor from the graphics pipeline.

In so doing, embodiments of the present disclosure provide an ability to balance the processing load using available secondary processor(s). A secondary processor that might otherwise remain idle can be used to facilitate graphics pipeline processing performed by a graphics processing unit and/or processing performed by a central processing unit, or other processing unit. Thus, for example, operations that may otherwise wait for a processing resource can be directed to an available secondary processor, which results in faster throughput. Advantageously, it has been determined that there is an increase in throughput, e.g., as measured in frames per second, using a secondary processor over processing in which the secondary processor is not used. In addition, embodiments of the present disclosure can use information fed back from the secondary processing to perform load balancing. The feedback can be used, for example, to determine when a secondary processor has reached a certain, threshold processing level. When the secondary processor is determined to reach a threshold processing capacity, processing can be directed to another processing unit, such as a central processing unit.

In addition, embodiments of the present disclosure provide an ability to make use of a processing unit for other than its primary processing purpose, to perform one or more other secondary functions if such processing unit is available. Use of such hardware, e.g., a processing unit, that might otherwise be idle results in more efficient use of the hardware.

In accordance with an aspect of the present disclosure, a method comprises in response to a draw request, determining whether or not a processing unit is available to assist in graphics pipeline processing, the processing unit having a primary processing function; requesting allocation of the secondary processor to perform a secondary processing function other than the primary processing function of the processing unit to assist in graphics pipeline processing; and in a case that the allocation request is successful: making graphics pipeline data available to the processing unit; monitoring the status of processing by the processing unit; and integrating data output by the processing unit into the graphics pipeline data.

In accordance with another aspect of the present disclosure, a computer-readable memory medium which stores program code is provided, the program code comprises code to determine whether or not a processing unit is available to assist in graphics pipeline processing, the processing unit having a primary processing function; request allocation of the secondary processor to perform a secondary processing function other than the primary processing function of the processing unit to assist in graphics pipeline processing; and in a case that the allocation request is successful: make graphics pipeline data available to the processing unit; monitor the status of processing by the processing unit; and integrate data output by the processing unit into the graphics pipeline data.

In accordance with another aspect of the present disclosure, an apparatus comprises a graphics processing unit configured to implement a graphics pipeline; and a secondary processing manager coupled to the graphics processing unit, the secondary processing manager configured to: determine whether or not a processing unit coupled to said secondary processing manager is available to assist in graphics pipeline processing, said processing unit having a primary processing function; request allocation of said secondary processor to perform a secondary processing function other than the primary processing function of said processing unit to assist in graphics pipeline processing; and in a case that the allocation request is successful, the secondary processing manager is further configured to: make graphics pipeline data available to said processing unit; monitor the status of processing by said processing unit; and integrate data output by the processing unit into the graphics pipeline data.

In accordance with yet another aspect of the present disclosure, an apparatus comprises a graphics processing unit configured to implement a graphics pipeline; and a secondary processing management means coupled to the graphics processing unit, the secondary processing management means comprising: means for determining whether or not a processing unit coupled to said secondary processing manager is available to assist in graphics pipeline processing, said processing unit having a primary processing function; means for requesting allocation of said secondary processor to perform a secondary processing function other than the primary processing function of said processing unit to assist in graphics pipeline processing; in a case that the allocation request is successful, said secondary processing management means further comprising: means for making graphics pipeline data available to said processing unit; means for monitoring the status of processing by said processing unit; and means for integrating data output by the processing unit into the graphics pipeline data.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 3, which comprises

DETAILED DESCRIPTION

Figure 1:
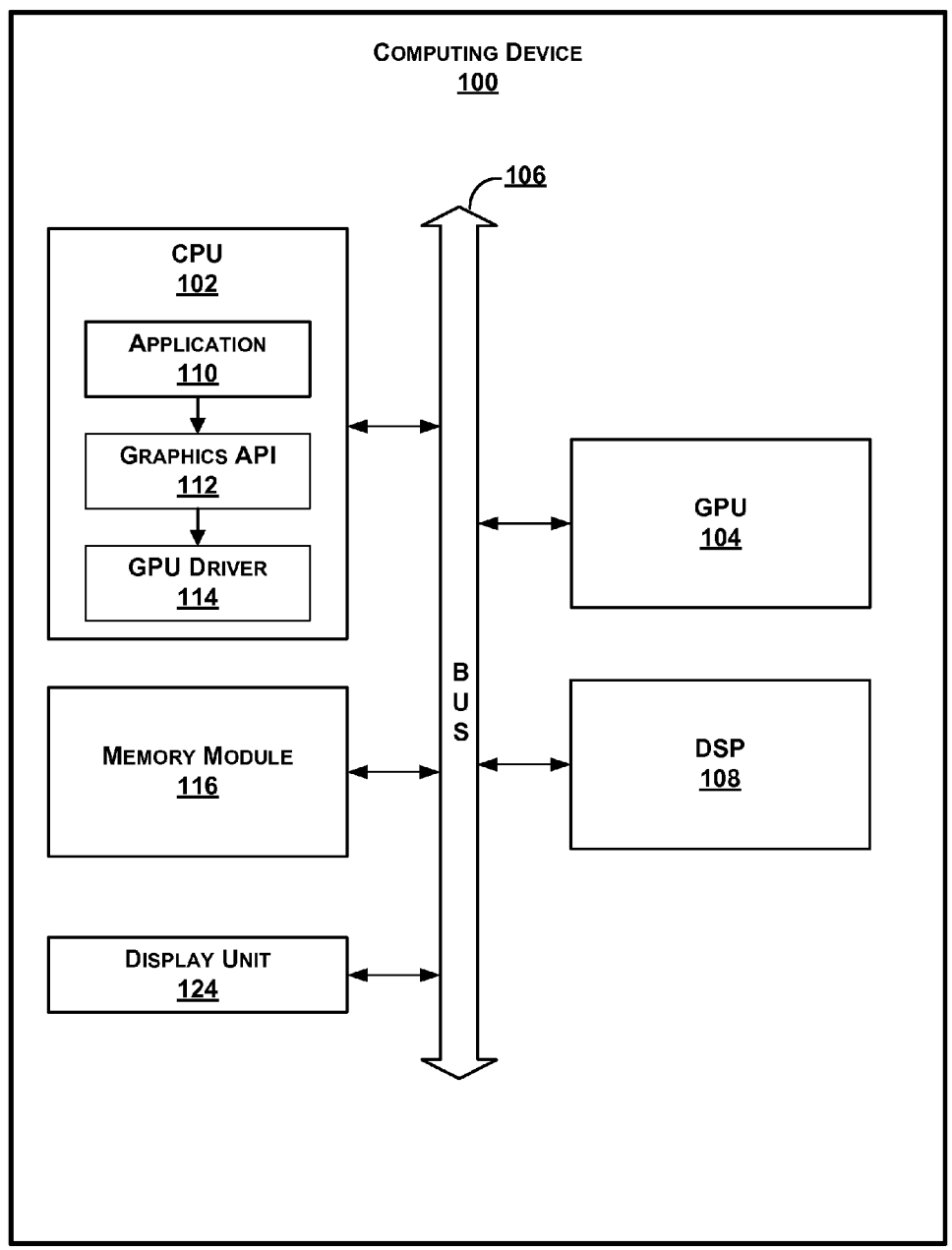
FIG. 1 is a block diagram illustrating an exemplary device for use in accordance with one or more embodiments of the present disclosure.

Certain embodiments of the present disclosure will now be discussed with reference to the aforementioned figures, wherein like reference numerals refer to like components.

In accordance with one or more embodiments, a system, method and apparatus are disclosed, in which a secondary processor unit is configured to operate on graphics pipeline data, with the output from secondary processor being integrated into the graphics pipeline such that the output is made available to one or more modules executing in the graphics pipeline. In accordance with such embodiments, a determination is made whether or not to use the secondary processor, and in a case that the secondary processor is to be used, a command stream is provided to the secondary processor. For example, the command stream can comprise one or more commands. Each command provided to the secondary processor contains information identifying the current command. In a case that there is another command, the current command contains information that identifies the next command. In a case, that the current command is the last command, the current command contains information to identify the current command as the last command. The command stream provides information to the secondary processor, which information can include, but is not limited to, input and/or output data storage location(s), and a feedback storage location.

In accordance with one or more embodiments, the secondary processor is a digital signal processor (DSP), which is configurable to perform primary processing, e.g., process audio and/or video data, and which can be configured to perform secondary processing. In accordance with one or more such embodiments, the DSP is shared such that it is available to perform audio and/or video data processing, and can assist with graphics pipeline processing when available, e.g., not processing audio/video data. For the sake of simplicity only, embodiments disclosed herein are described with reference to a second processor as a DSP. It should be apparent that any processor, or processing unit, can be used with embodiments of the present disclosure.

FIG. 1 is a block diagram illustrating an exemplary computing device 100 for use in accordance with one or more embodiments of the present disclosure. The exemplary computing device 100 may comprise a personal computer, a desktop computer, a laptop computer, a workstation, a video game platform or console, a cellular or satellite radiotelephone, a landline telephone, an Internet telephone, a handheld device such as a portable video game device or a personal digital assistant, a personal music player, a server, an intermediate network device, a mainframe computer, or another type of device that outputs graphical information.

In the example of FIG. 1, computing device 100 includes a central processing unit (CPU) 102, GPU 104, a DSP 108, as an example of a secondary processor, a display unit 124, and a memory module 116, e.g., a random access memory (RAM) memory module or modules. The components of computing device 100, e.g., CPU 102, GPU 104, DSP 108 and memory module 116 can communicate using a bus 106, which can comprise any type of bus or device interconnect now known or later discovered. CPU 102 can comprise a general purpose or a special purpose microprocessor. For example, CPU 102 may comprise a reduced instruction set computer (RISC) processor designed by ARM Inc., having offices at various locations around the world, including Irvine, Calif., and whose parent company is ARM Holdings PLC of Cambridge, UK. By way of a further non-limiting example, CPU 102 may comprise a Core 2 Processor provided by Intel Corporation of Santa Clara, Calif. or another type of microprocessor. GPU 104 is a dedicated graphics computing device. GPU 104 can be an Imageon media co-processor provided by AMD of Sunnyvale, Calif., or another type of graphics processing unit, for example. GPU 104 can be integrated into the motherboard of computing device 100, can be present on a graphics card that is installed in a port in the motherboard of computing device 100, or can be otherwise configured to interoperate with computing device 100, for example.

Display unit 124, which is coupled to computing device 100, can comprise a monitor, a television, a projection device, a liquid crystal display, a plasma display panel, a light emitting diode (LED) array, a cathode ray tube display, electronic paper, a surface-conduction electron-emitted display (SED), a laser television display, a nanocrystal display, or another type of display unit, for example. In the example of FIG. 1, display unit 124 can be a part of computing device 100. For instance, display unit 124 can be a screen of a mobile telephone. Alternatively, display unit 124 can be external to computer device 100 and can be in communication with computing device 100 via a wired or wireless communications connection or other connection, for example. By way of a non-limiting example, display unit 124 can be a computer monitor or flat panel display connected to a personal computer via a wired or wireless connection.

Software application 110 can comprise any software application capable of executing via CPU 102, such as a video game, a graphical user interface engine, a computer-aided design program for engineering or artistic applications, or another type of software application that uses two-dimensional (2D) or three-dimensional (3D) graphics, by way of non-limiting examples. When CPU 102 is executing software application 110, software application 110 can invoke subroutines of a graphics processing application programming interface (API) 112, such as any one or more of an OpenVG API, an OpenGL API, a Direct3D API, a Graphics Device Interface (GDI), Quartz, QuickDraw, or another type of 2D or 3D graphics processing API, by way of non-limiting examples.

In accordance with at least one embodiment, when software application 110 invokes a subroutine of graphics processing API 112, graphics processing API 112 invokes one or more subroutines of a GPU driver 114, which execute via CPU 102 on computing device 100. GPU driver 114 can comprise a set of software and/or firmware instructions that provide an interface between graphics processing API 112 and GPU 104, for example. When graphics processing API 112 invokes a subroutine of GPU driver 114, GPU driver 114 formulates and issues a command that causes GPU 104 to generate displayable graphics information. For example, when graphics processing API 112 invokes a subroutine of GPU driver 114 to draw, or render, a batch of graphics primitives, GPU driver 114 provides GPU 104 with a processing configuration, which GPU 104 uses to render the batch of graphics primitives. GPU 104 renders the batch of graphics primitives, and outputs a raster image of the graphics primitives, for example.

A command formulated by GPU driver 114 can identify graphics processing configuration(s) that GPU 104 is to use to perform the command, which configuration(s) can identify a set of instructions to be executed by GPU 104, a set of state register values, and other types of information that GPU 104 might need to perform the command.

In a case that GPU driver 114 stores the graphics processing configuration(s) in memory 116, GPU driver 114 can reference the storage locations in memory module 116 corresponding to the graphics processing configuration(s) in the command formulated by GPU driver 114. When GPU 104 receives the command, GPU 104 can retrieve from memory 116 the graphics processing configuration(s) referenced in the command received from GPU driver 114.

In accordance with at least one embodiment, a command decoder (not shown) of GPU 104 decodes the command from GPU driver 114 and configures one or more of processing elements of the GPU 104 to perform the command using data, e.g., position, color, texture, etc. data, retrieved from memory 116.

In accordance with one or more embodiments, the processing elements, or modules, of GPU 104 implement a graphics pipeline. In accordance with such embodiments, the GPU's 104 processing elements can implement the graphics pipeline in a parallel mode, such that the processing elements operate on data in parallel, with output from one processing element being used as input to another processing element. By way of a non-limiting example, a first processing element performs a first graphics operation on a first set of initial input data and outputs a first set of intermediate results to a second processing element. The initial input data can comprise data corresponding to one or more vertices, which data can comprise coordinate and attribute data, for example. Vertex coordinates identify a location within an image based on, for example, a four-dimensional coordinate system with X, Y, and Z (width, height, and depth) coordinates, and a W coordinate forms a homogenous coordinate. Vertex attributes can include color, normal, and texture coordinates associated with a vertex, for example. The second processing element can perform another graphics operation on the first set of intermediate results output by the first processing element, and output a second set of intermediate results to a third processing element, and so on. While the second processing element is performing the second graphics operation, the first processing element can be performing the first graphics operation on a second set of initial input data.

The GPU 104, and its processing elements, can continue in this manner until the last processing element outputs a pixel object to one or more buffers in memory module 116, or output this new pixel object to some other destination. A pixel object is data that describes a pixel. Each pixel object may specify multiple color values, and can specify a transparency level of the pixel. In some circumstances, a pixel object may specify a first color in a first color format and a second color in a second color format.

In accordance with one or more embodiments of the disclosure, the GPU's 104 processing modules can include software executed by the GPU 104, dedicated hardware modules and/or programmable processing modules configured to perform one or more of the GPU's 104 processing modules. The GPU's 104 processing modules implement a graphics pipeline, which can comprise vertex shader, primitive assembly, viewport transformation, primitive setup, rasterization, hidden primitive and pixel rejection, attribute setup, attribute interpolation and fragment shader stages, for example.

Embodiments of the present invention can assign a secondary use to DSP 108, or other secondary processor, to operate on data used in the graphics pipeline. In accordance with one or more embodiments, the secondary use is different from the secondary processor's primary use. For example, DSP 108 can be used to process audio and video data, and can further be used to implement one or more lighting modules that operate on graphics pipeline data. In so doing, the secondary processor can supplement the resources otherwise used to implement a graphics pipeline.

In accordance with embodiments of the present disclosure, the secondary processor is used when it is determined that the secondary processor is not being used for its primary purpose(s). For example, in a case that DSP 108 is determined to be idle, i.e., not processing audio or video data, a request is made to allocate the DSP 108 for use as a secondary processor in connection with the graphics pipeline. In such a case, DSP 108 can be used to perform some form of secondary processing, e.g., lighting, on graphics pipeline data, or other processing, e.g., skinning, etc.

Figure 2:
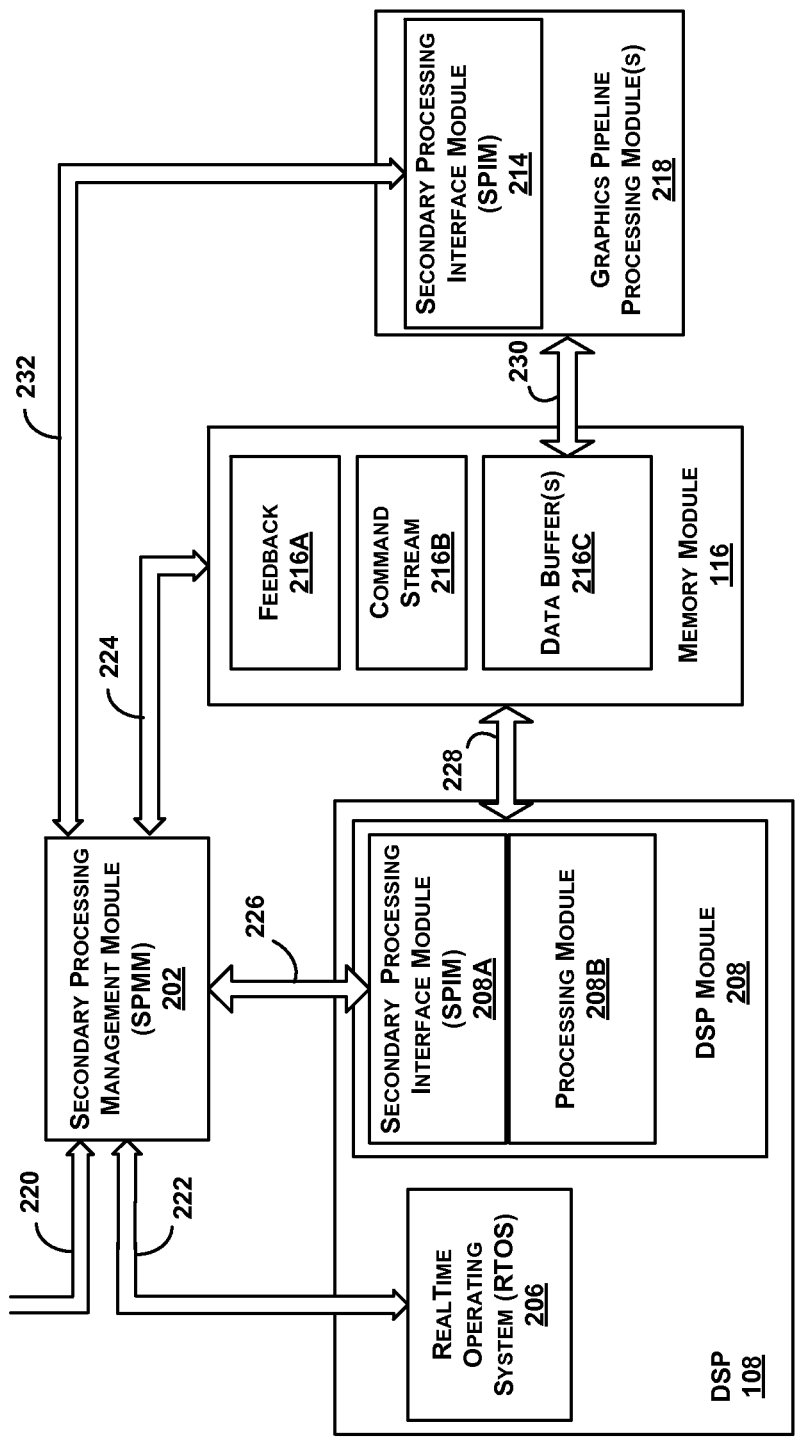
FIG. 2 illustrates a block diagram comprising components and inter-component communication used in accordance with one or more embodiments of the present disclosure.

FIG. 2 illustrates a block diagram comprising components and inter-component communication used in accordance with one or more embodiments of the present disclosure. A secondary processing management module (SPMM), or secondary processing manager, 202 manages secondary processing in combination with one or more secondary processing interface modules (SPIMs). In accordance with one or more embodiments, the SPMM and SPIM modules are separate modules. Alternatively, one or more of the SPMM and SPIM modules are combined to form a single module. As yet another alternative, one or more of the SPMM and SPIM modules can be integrated with other program code. By way of a non-limiting example, a SPIM can be integrated with program code executing the secondary processing, and/or a SPIM can be integrated with program code executing a module of a graphics pipeline. The SPMM 202 determines whether it is possible to use a secondary processor, provides a command stream, which comprises one or more commands, to the secondary processor, and synchronizes data access by the secondary processing and one or more graphics pipeline processing modules, with the graphics pipeline data operated on by the secondary processor is integrated into the data processed by the graphics pipeline.

In the example shown in FIG. 2, a DSP 108 is being used as a secondary processor. It should be apparent that any processing unit can be used as a secondary processor in accordance with one or more embodiments of the present disclosure. The SPMM 202 receives notification 220 when an application 110 issues a draw call. The SPMM 202 analyzes the draw call, and associated information, provided by the application 110 to determine whether processing of the draw call includes processing that can be performed by a secondary processor. For example, the SPMM 202 determines whether processing of the draw call involves application of one or more lighting models to the color data. By way of another non-limiting example, the SPMM 202 can examine the draw call to determine whether or not skinning is to be applied.

In a case that the SPMM 202 determines that processing can be performed by a secondary processor, the SPMM 202 attempts to allocate the secondary processor for the secondary processing. For example, the SPMM 202 communicates 222 with a real time operating system (RTOS) 206 of the DSP 108 to request the DSP 108. The communication 222 includes a call back used by the RTOS 206 to notify the SPMM 202 whether or not the DSP 108 is available, e.g., whether or not the SPMM's 202 allocation request was successful. If the RTOS 206 determines that the DSP 108 is available, e.g., is not being used for its primary purpose, the RTOS 206 loads a DSP module 208, which comprises the secondary processing module 208B and a secondary processing interface module (SPIM) 208A.

The secondary processing module 208B comprises the program code used to perform the secondary processing. The SPIM 208A comprises program code configured to interface with the SPMM 202, such as providing feedback to feedback memory area 216A in memory module 116 via communication path 228. The SPMM 202 provides information to SPIM 208A, via communication path 226, which identifies feedback area 216A, the storage location of the input data and output data, e.g., locations in data buffer(s) 216C. In addition, SPIM 208A provides information to processing module 208B, which information can be used by the processing module 208B to perform the secondary processing, e.g., lighting.

In accordance with one or more embodiments, the SPMM 202 uses communication path 226 to provide information associated with a set of commands, referred to as a stream of commands or a command stream, used by the processing module 208B. In accordance with one or more such embodiments, the SPMM 202 communicates an initial message to SPIM 208A, which comprises a pointer to a first command of a command stream stored in a command stream area 216B of memory module 116, and a pointer to feedback area 216A in memory module 116. Briefly, a command in the command stream includes information to identify the location of input and output data in data buffer(s) 216C, the location of feedback 216A, pointer to next command in stream or indication that the current command is the last command, and other information, such as lighting models used in a case that DSP module 208 performs lighting. The contents of a command are described in more detail below.

The SPMM 202 loads each command into command stream 216B via communication path 224 and forwards a pointer to the first command in command stream 216B to SPIM 208A via communication path 226 and the initial message sent by the SPMM 202 to the SPIM 208A. Thereafter, the SPIM 208A uses information contained in the first, or current, command, to locate the next command in the command stream 216B, or to identify the first/current command as the last command. The SPIM 208A can access feedback 216A, command stream 216B and/or data buffer(s) 216C based on information contained in a given command in the command stream and the initial information provided by the SPMM 202 via communication path 226. The DSP module 208, which includes the SPIM 208A and processing module 208B, can access one or more areas of memory 116 via communication path 228, for example.

The data contained in data buffer(s) 216C is used by both processing module 208B and the graphics pipeline processing modules 218. In a case that there is at least one data dependency between the module 208B and at least one of the modules 218, the SPMM 202 synchronizes data access by the modules 208B and 218 based on information provided by SPIM 208A stored in feedback 216A and information provided by the SPIM 214, which operates in connection with the graphics pipeline processing module(s) 218. For example, the SPMM 202 can use information in feedback 216A to notify the SPIM 214 that lit color data is available for processing by one or more graphics pipeline process modules 218. By way of a further non-limiting example, the lit color data can be made available to a clipping module of the graphics pipeline processing module(s) 218 once the SPMM 202 determines that the color data corresponding to all of the primitives needed by the clipping module have been processed by processing module 208B. The SPMM 202 and the SPIM 214 can communicate via communication pathway 232, e.g., the SPIM 214 notifies the SPMM 202 that one or more of the graphics pipeline processing module(s) 218 is ready to process data, and/or the SPMM 202 notifies the SPIM 214 that data is available to be processed by the graphics pipeline processing module(s) 218.

In addition, the SPMM 202 can use information in the feedback area 216A to determine when an area in command stream 216B can be overwritten with a new command in the command stream. By way of a non-limiting example, the feedback 216A comprises information identifying the latest command completed by the secondary processing module 208B. In a case that the secondary processing module 208B is no longer accessing a command in the command stream 216B, and the SPMM 202 determines that the command is no longer needed, the SPMM 202 can elect to use the area for a new command in the command stream. The SPMM 202 might determine that the command is no longer needed in a case that the graphics pipeline has finished processing the graphics pipeline data corresponding to the command.

In accordance with one or more embodiments, the SPMM 202, SPIM 208A and SPIM 214 comprise program code that is executed by one or more processing units, or processors. Such processing units can include, without limitation, the CPU 103, the DSP 108 and the GPU 104. By way of a non-limiting example, the SPMM 202 and the SPIM 214 comprise program code that is executed by the CPU 103, and the SPIM 208A comprises program code executed by the DSP 108. By way of a further non-limiting example, the SPMM's 202 program code is executed by the CPU 103, the SPIM 214 comprises program code executed by the GPU 104 and the SPIM 208A comprises program code executed by the DSP 108. It should be apparent, however, that any one or more processing units can be used to implement the program code of the SPMM 202, the SPIM 208A and the SPIM 214. By way of a further non-limiting example, bus 106 can be used to facilitate the communication paths 220, 222, 224, 226, 228, 230 and 232 and/or communication between SPMM 202, RTOS 206, DSP module 208, which comprises SPIM 208A and processing module 208B, memory module 116, SPIM 214 and graphics pipeline processing module(s) 218. Communication path 230 can be used by one or more of graphic pipeline processing modules 218 to access graphics pipeline data stored in data buffer(s) 216C, for example.

Figure 3A:
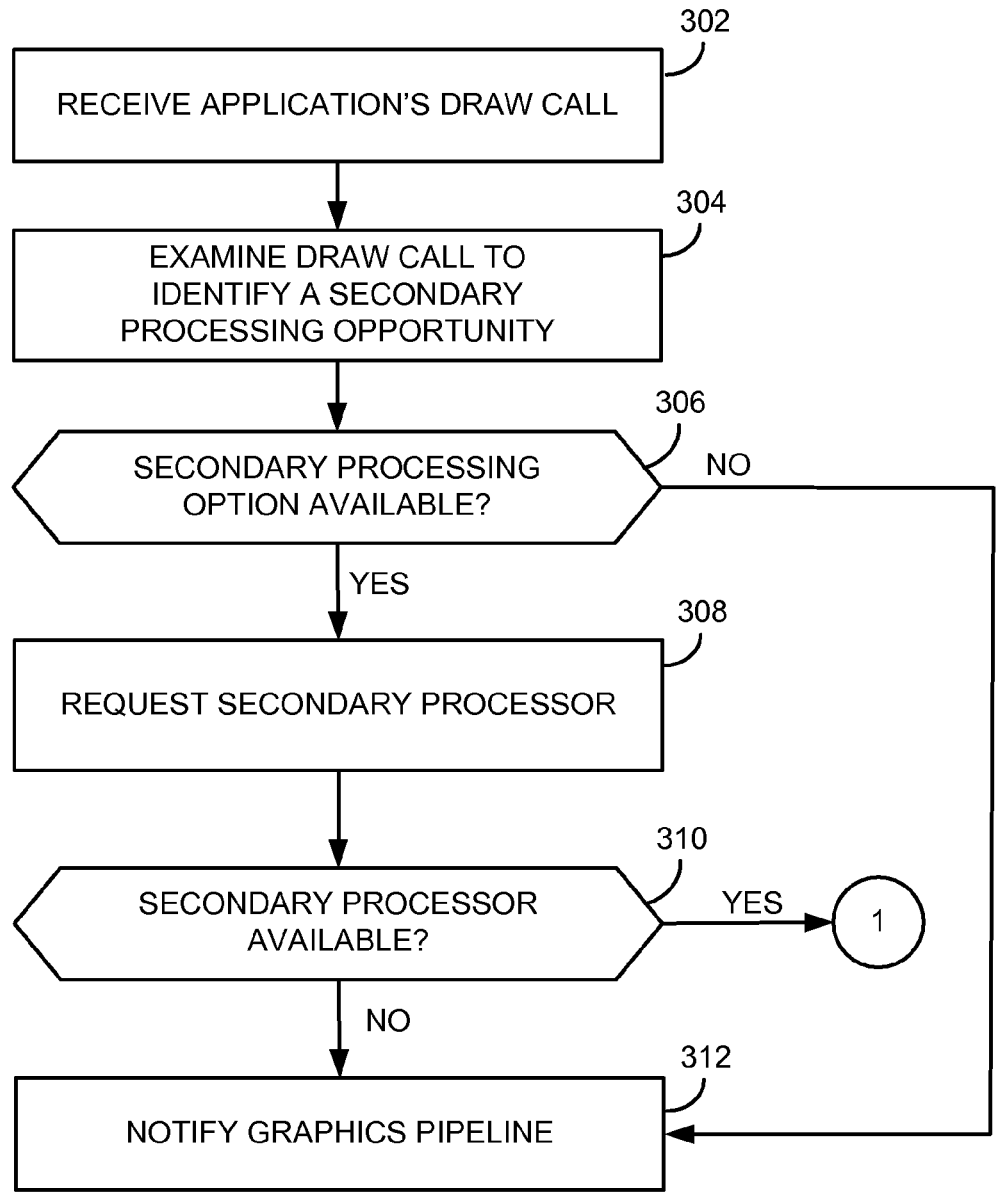
FIGS. 3A and 3B, illustrates a program code process flow implementing a secondary processing management module in accordance with one or more embodiments of the present disclosure.
Figure 3B:
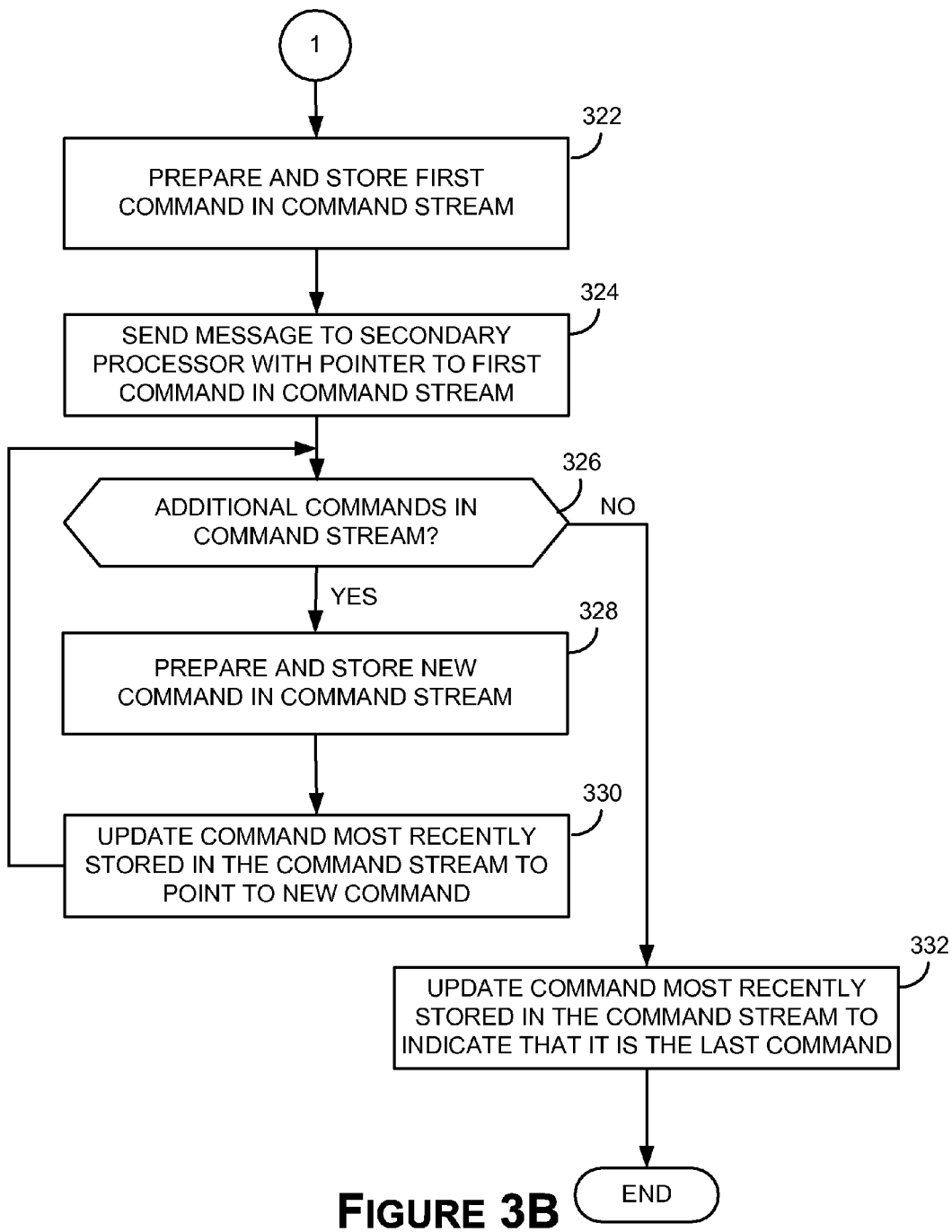

FIG. 3, which comprises FIGS. 3A and 3B, illustrates a program code process flow implementing the SPMM 202 in accordance with one or more embodiments of the present disclosure. At step 302, the SPMM 202 receives a draw call, e.g., a call made by the application 110 to the graphics API 112. The SPMM 202 examines the draw call to identify an opportunity to use secondary processing, at step 304. For example, the SPMM 202 can examine the draw call to identify whether or not the application 110 requests that one or more lighting models be applied to the color data. If the SPMM 202 determines at step 306 that no secondary processing opportunity exists from an examination of the draw call, processing continues at step 312 to notify the graphics pipeline, e.g., the SPIM 214, that there is no secondary processing. Such a notification eliminates the need for the SPIM 214 to coordinate access by the graphics pipeline processing module(s) 218 to data stored in the data buffer(s) 216C, for example.

If the SPMM 202 determines at step 306 that there is an opportunity to use secondary processing, processing continues at step 308 wherein the SPMM 202 requests the secondary processor. For example, the SPMM 202 sends a request to the DSP's 108 RTOS 206 to load DSP module 208, and provides a call back for the RTOS 206 to notify the SPMM 202 whether or not the SPMM's 202 request succeeded or failed. If it is determined at step 310 that the RTOS 206 notifies the SPMM 202 that the request failed, processing continues at step 312 to notify the graphics pipeline that there is no secondary processing. In such a case and in accordance with one or more embodiments, the SPMM 202 can notify the CPU 102 to perform the lighting.

If the RTOS 206 notifies the SPMM 202 that the request for the secondary processor succeeded, processing continues at step 322 of FIG. 3B. At step 322, the SPMM 202 prepares the first command in the command stream and stores the first command in the command stream 216B. In accordance with one or more embodiments, the SPMM 202 uses a linked list approach to communicate the command stream to the secondary processor. By way of a non-limiting example, each command contains a pointer to the next command. By way of a further non-limiting example, a command can contain a pointer to any command in the command stream, such as a pointer to a previous command in the command stream. In a case where the current command is the last command, the pointer to the next command contains a value, e.g., a hexadecimal value of 0xFFFFFFFF, which identifies the current command as the last command.

In accordance with one or more embodiments, the SPMM 202 may not know at the time it stores a command in command stream 216B whether or not there are to be additional commands. In such a case, SPMM 202 stores a value of zero as a pointer to the next command in the linked list to notify the SPIM 208A that there may be additional commands. In a case that the module 208B completes processing associated with a current command, SPIM 208A looks at the pointer in the command just completed to locate a next command, if any, in the command stream 216B. If the pointer is set to a value of zero, the SPIM 208A knows that the SPMM 202 has not yet updated the pointer. In such a case, the SPIM 208A can wait a period of time before checking the pointer to see whether the SPMM 202 has updated the pointer. If the pointer has a non-zero value, the SPIM 208A examines the value to determine whether it points to a next command in the command stream 216B, or indicates that the completed command is the last command in the command stream. In the latter case, the SPMM 202 can store a value, e.g., a hexadecimal value of 0xFFFFFFFF in the pointer to notify the SPIM 208A that there are no more commands to be processed in the current command stream, and the DSP 108 can be used to perform its primary, or other, processing.

Figure 7:
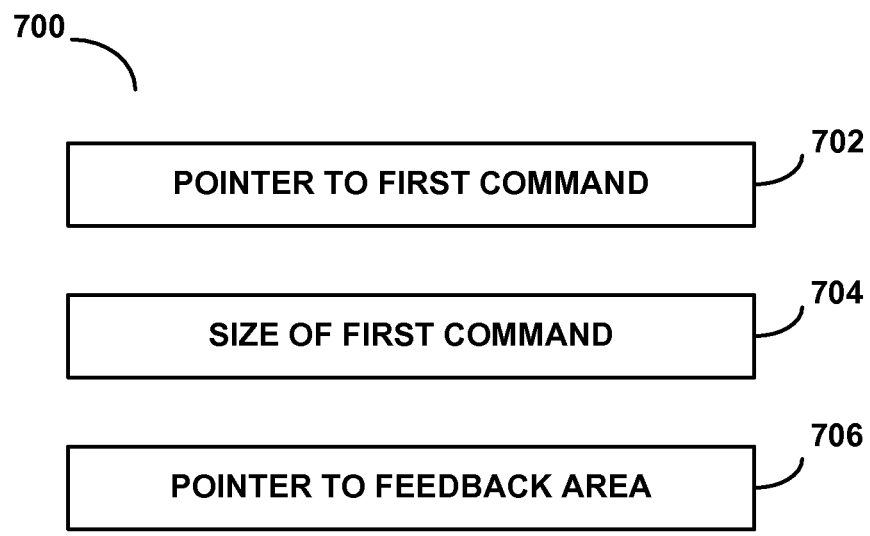
FIG. 7 provides an example of information contained in a configuration message forwarded to a secondary processing module in accordance with one or more embodiments of the present disclosure.

At step 324, the SPMM 202 sends the initial message to the secondary processor containing information corresponding to the first command. The message sent by the SPMM 202 to the SPIM 208A has information corresponding to the first command. The message sent by the SPMM 202 notifies the secondary processor that it can commence processing, and provides information to locate the first command. In accordance with one or more embodiments of the present disclosure, and with reference to FIG. 7, an initial message 700 comprises a pointer 702 to the command in the command stream memory 216B, information 704 identifying the size of the command's storage area in the command stream memory 216B, and a pointer 706 to the feedback 216A storage area of memory module 216. Referring again to FIG. 3B, after the SPMM 202 sends the message notifying the secondary processor of the first command in the command stream at step 324, the SPMM's 202 processing continues at step 326 to determine whether there are additional commands in the command stream.

If the SPMM 202 determines, at step 326, that there is at least one additional command that is to be generated for the current draw call, processing continues at step 328. At step 328, the SPMM 202 prepares the new command and stores the new command in the command stream 216B. At step 330, the SPMM 202 sets the pointer in the immediately preceding command, e.g., the first command, in the command stream 216B to point to the new command in the command stream 216B, e.g., to point to a location in command stream 216B at which the new command is to be stored. As with the first command, the new command, and any succeeding command, contains a pointer, which points to the next command (if a next command is generated by the SPMM 202), or an indicator that the new command is the last command (if there is no next command). In accordance with one or more embodiments, after the initial message is sent to the secondary processor, the SPMM 202 and the secondary processor's processing module, e.g., DSP module 208, communicate via the command stream 216B and the feedback 216A. In so doing, overhead can be minimized, since there is no need to send messages between the two processing modules. The DSP module 208 navigates the linked list of commands in the command steam 216B to process data, and provides feedback to the SPMM by writing status information to feedback 216A of memory module 216. In accordance with one or more embodiments, the DSP module 208 operates asynchronously and independently with respect to the SPMM 202 and the graphics pipeline processing modules 218.

Once the SPMM 202 updates the pointer in the preceding command to point to the new command, processing continues at step 326 to determine whether or not any additional commands remain to be generated. If not, processing continues at step 332 to update the pointer contained in the last command to a value, e.g., a hexadecimal value of 0xFFFFFFFF, to notify the SPIM 208A that the command is the last command in the current command stream 216B, and processing ends for the current draw call. If there are additional draw calls, processing continues at step 322 to prepare a command stream in connection with another draw call.

Figure 4:
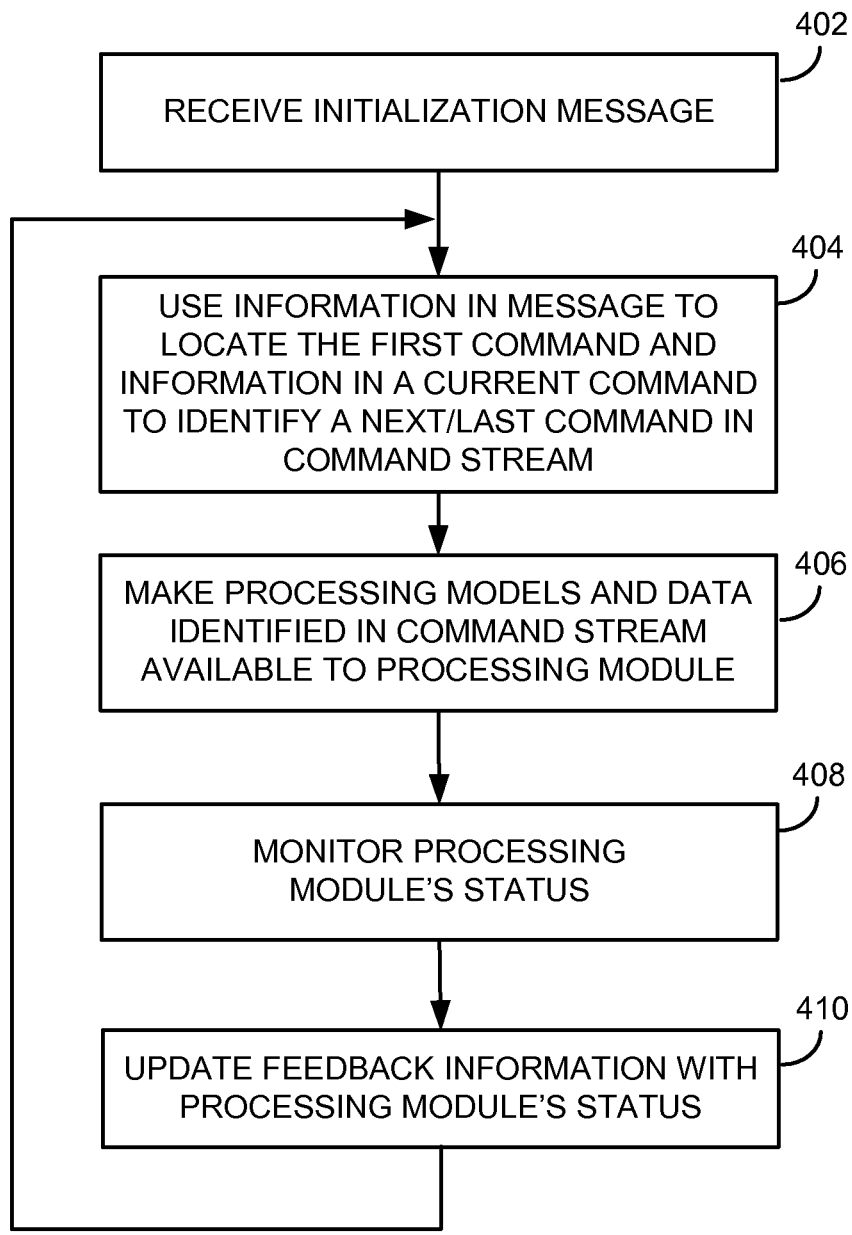
FIG. 4 illustrates a program code process flow implementing a secondary processing interface module in accordance with one or more embodiments of the present disclosure.

The SPIM 208A provides an interface between the SPMM 202 and processing module 208B. In accordance with one or more embodiments SPIM 208A receives information corresponding to the command stream generated by the SPIM 202, facilitates processing performed by the processing module 208B, monitors the processing module's 208B processing status, and provides feedback on the processing module's 208B processing. FIG. 4 illustrates a program code process flow implementing the SPIM 208A in accordance with one or more embodiments of the present disclosure.

At step 402, the SPIM 208A receives the initialization message from the SPIM 202. By way of a non-limiting example, the SPIM 208A receives the initialization message 700, which includes a pointer to a location in command stream 216B that corresponds to the first command, information 704 to identify the size, e.g., in bytes, of the first command, and a pointer 706 to a location in feedback 216A area. At step 404, the SPIM 208A uses the information in the message 700 to locate the first command in the command stream 216B, and to identify whether the current command is the last command.

At step 406, the SPIM 208A makes the information contained in the current command available to the processing module 208B. For example, location information, e.g., pointers and size information, is used to initiate a data move operation to access, e.g., load and/or store, data in data buffer(s) 216C. In addition, the command can include a location of color data in data buffer(s) 216C, such as a pointer to input color data associated with a first vertex, and an increment to add to the pointer to locate color data for a next vertex. The current command can further comprise a pointer to a location in an output buffer in data buffer(s) 216C associated with the first vertex, as well as an increment to locate the output location for color data associated with the next vertex. By way of a further non-limiting example, in a case that processing module 208B performs lighting, the current command can include one or more lighting models. As another non-limiting example, in a case that the processing module 208B performs skinning, the command can include skinning matrices. In accordance with one or more embodiments, the first command can provide a complete set of the lighting models, or skinning matrices, with subsequent commands identifying any changes in the lighting models, or skinning matrices, specified in the previous command.

Figure 8:
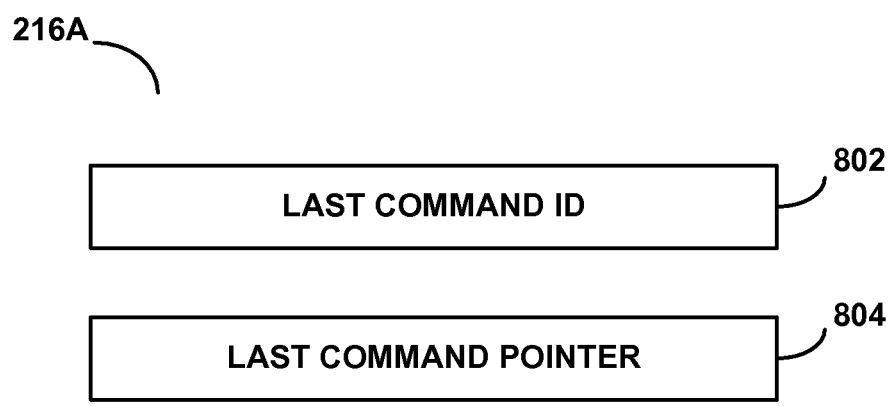
FIG. 8 provides an example of information that can be stored in the feedback 216A in accordance with one or more embodiments of the present disclosure.

At step 408, the SPIM 208A monitors the progress of the processing module 208B, and at step 410 updates information in feedback 216A with information identifying a status of processing performed by the processing module 208B. FIG. 8 provides an example of information that can be stored in the feedback 216A in accordance with one or more embodiments of the present disclosure. In accordance with one or more such embodiments, each command identifies a finite set of vertices, and a command is considered to be complete once the processing module 208B has processed the vertex data associated with the vertices identified by the command. Feedback 216A can comprise information to identify the latest command completed by the processing module 208B, e.g., last command identifier (ID) 802, and a pointer 804 to the command in command stream 216B.

Referring again to FIG. 4, the SPIM 208A proceeds at step 404 to use information in the current command to make the data used in processing available to the processing module 208B, and to update the feedback 216A with a status of the secondary processing.

As discussed above and in accordance with one or more embodiments, the secondary processor operates asynchronously and independent of the SPMM 202 and the graphics pipeline processing modules 218. In at least one case, however, the secondary processing, e.g., the processing performed by the DSP module 208, is synchronized with processing performed by the graphics pipeline processing modules 218, so that data that is processed by the secondary processor and that is to be further processed by the graphics pipeline processing modules 218 is synchronized. In such a case, the SPMM 202 operates in connection with the SPIM 214, which can provide an interface between the graphics pipeline processing modules 218 and the SPMM 202, to manage data access by the graphics pipeline processing modules 218 such that the modules 218 use data that has been processed by the secondary processor. In accordance with one or more embodiments, SPMM 202 and SPIM 214 can comprise a single module.

Figure 5:
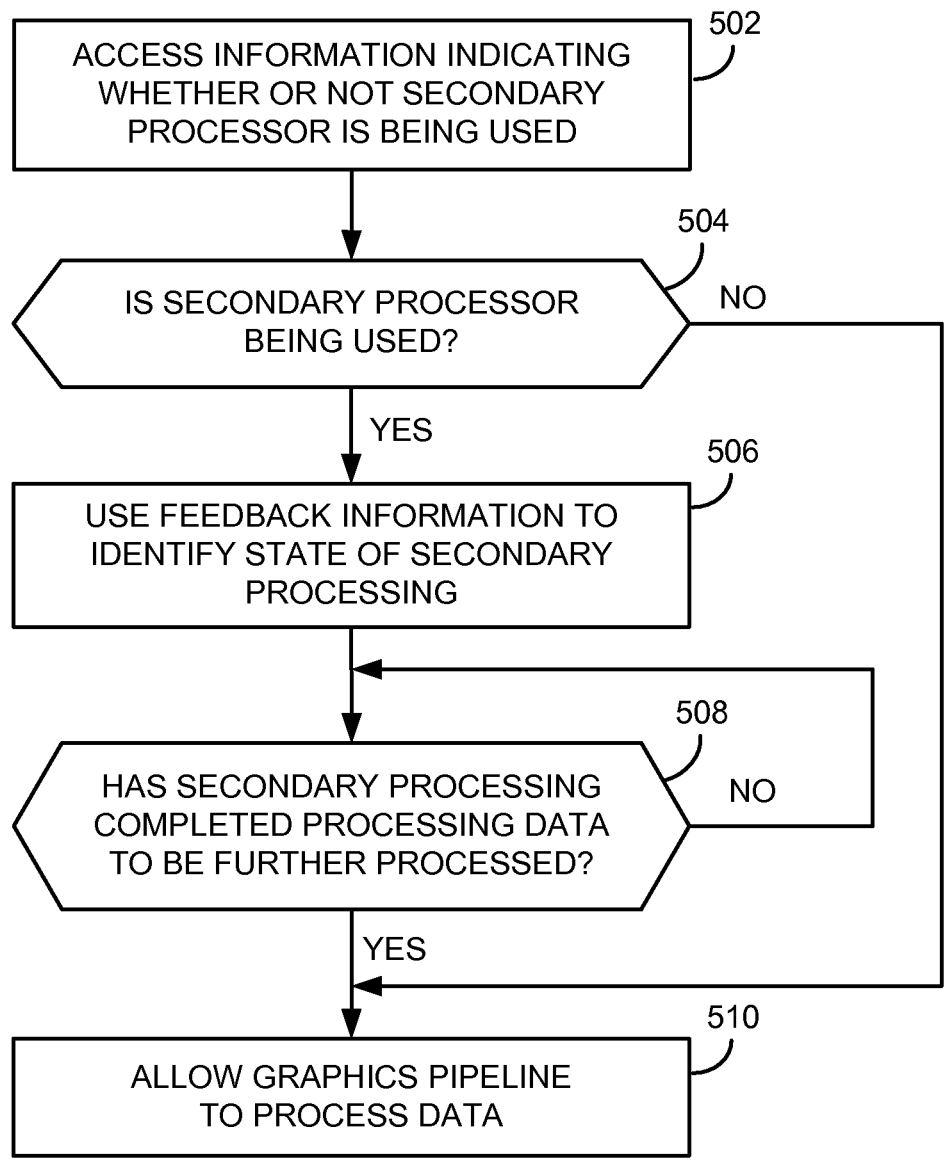
FIG. 5 illustrates a synchronization program code process flow for use in accordance with one or more embodiments of the present disclosure.

FIG. 5 illustrates a synchronization program code process flow for use in accordance with one or more embodiments of the present disclosure. In accordance with one or more embodiments, the graphics pipeline and the GPU 104 operate on a block of primitives, each of which has a set of vertices. In a case that a primitive comprises a triangle, for example, each primitive has an associated set of three vertices. The block of primitives can be represented as a list of primitives and their vertices. In accordance with one or more embodiments, the SPMM 202 determines whether or not secondary processing is to be performed for the primitives in a given primitive list, and sets a value, e.g., a logical value, in the primitive list to indicate whether or not secondary processing is used with the primitives identified in the primitive list.

In accordance with one or more embodiments, the value set in the primitive list can be used by the SPMM 202 to determine whether data associated with primitives to be processed by the graphics pipeline are first being processed by a secondary processor. At step 502, the SPMM 202 accesses the value set in the primitive list, and at step 504 the SPMM 202 determines whether or not secondary processing is being used. If SPMM 202 determines at step 504 that secondary processing is being performed, SPMM 202 synchronizes access by the graphics pipeline processing modules 218 to data being processed by the secondary processor so that the secondary processor completes its processing of the data that is to be further processed by the graphics pipeline processing modules 218 before the data is made available to the modules 218.

By way of a non-limiting example, if the value stored in the primitive list indicates that secondary processing is not being used, data accessed by the graphics pipeline processing modules 218 need not be synchronized with data access by the secondary processing module 208B. In such a case, the graphics pipeline processing modules 218 can operate in a non-synchronization mode, which does not involve synchronizing data access between the graphics pipeline processing modules' 218 use of vertex data with use of such vertex data by secondary processing module 208B. In a case that the value stored in the primitive list indicates that secondary processing is being used, the graphics pipeline processing modules 218 operated in a synchronization mode, to synchronize the modules' 218 access to vertex data with that of the processing module 208B.

If data access is to be synchronized, in accordance with one or more embodiments, SPMM 202 determines, at step 506 using feedback information provided by SPIM 208A, a state of the processing module 208B. In accordance with one or more embodiments, the SPIM 208A stores information in feedback 216A which identifies the processing state of processing module 208B by identifying the last primitive completed by processing module 208B. In accordance with one or more embodiments, primitives are assigned a sequential identifier, so that SPMM 202 is able to determine, at step 508 and based on the feedback information supplied by SPIM 208A, that primitives whose identifiers are equal to or less than the primitive identifier supplied by the SPIM 208A have been completed by the processing module 208B. At step 510, SPMM 202, in conjunction with SPIM 214, allows the graphics processing modules 218 to access the data stored in data buffer(s) 216C associated with the primitives determined to have been processed by the processing module 208B.

Figure 6A:
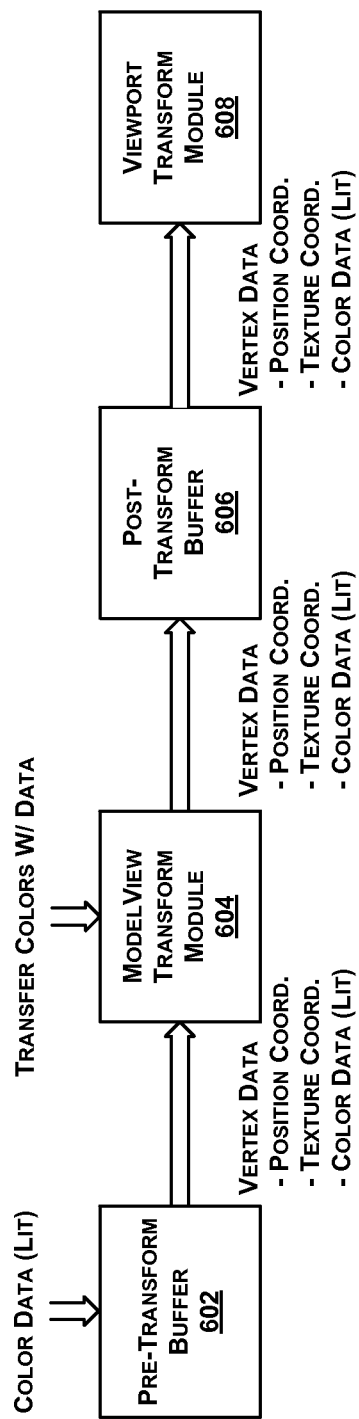
FIG. 6, which comprises FIGS. 6A and 6B, provides synchronization examples in accordance with one or more embodiments of the present disclosure.
Figure 6B:
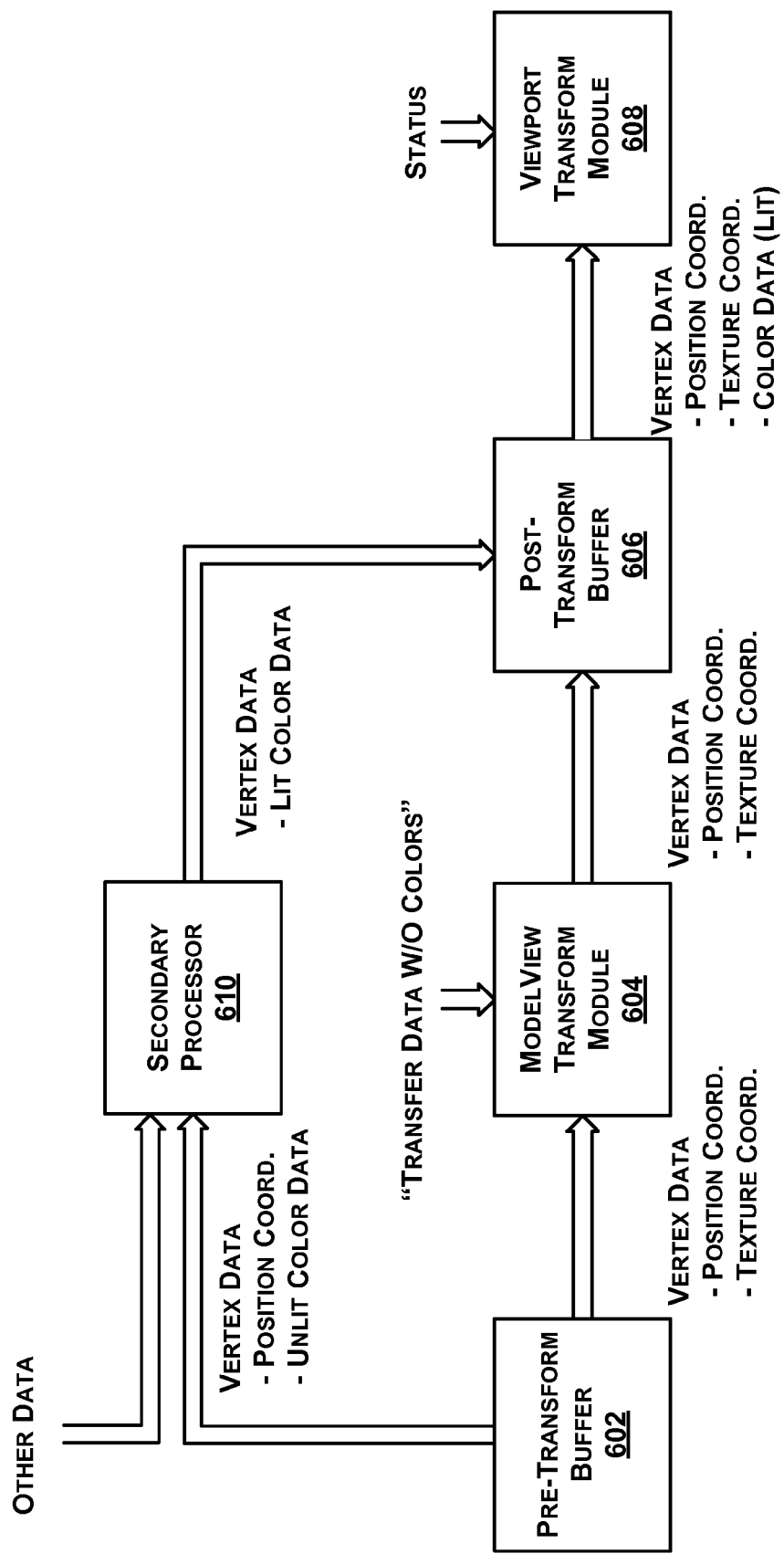

FIG. 6, which comprises FIGS. 6A and 6B, provides synchronization examples in accordance with one or more embodiments of the present disclosure. Referring to FIG. 6A, modules 604 and 608 provide examples of graphics pipeline processing modules 218, which access data stored in data buffer(s) 216C. In a non-synchronization mode, pre-transform buffer 602 stores vertex data, which includes position data, e.g., X, Y, Z, and W coordinate data, texture data and color data. The color data stored in the pre-transform buffer 602 comprises lit color data, or color data that has undergone lighting processing in a manner other than using a secondary processor. This may be the case, for example, if SPMM 202 determines that the secondary processor, e.g., DSP 108, is unavailable for secondary processing. In such a case, CPU 102 can perform lighting and store the values in pre-transform buffer 602.

In non-synchronization mode, the model view transform module 604 retrieves the vertex data, including lit color data, operates on vertex data other than the lit color data and stores the vertex data in the post-transform buffer 606. In non-synchronization mode, the model view transform module 604 is instructed to transfer the color data with the other vertex data. Although the transform module 604 does not modify the color data, it retrieves the lit color data from the pre-transform buffer 602 and stores the lit color data in the post-transform buffer 606, as instructed, so that the color data is available for processing by a succeeding module in the graphics pipeline, e.g., the viewport transform module 608. In the example shown in FIG. 6A, the viewport transform module 608 accesses the post-transform buffer 606 to retrieve the lit color data forwarded by the model view transform module 614, and uses the lit color data, e.g., interpolates color data, in its transformation operation(s).

FIG. 6B illustrates processing involving transform modules 604 and 608 and buffers 602 and 606 in a secondary-processing synchronization mode. In the example shown in FIG. 6B, secondary processor 610, e.g., DSP 108 implementing processing module 208B, retrieves the unlit vertex color data from the pre-transform buffer 602, together with position data. The secondary processor 610 uses the retrieved information together with other data, e.g., lighting model data, skinning matrix data, etc., to process the color data. In the case of lighting, the secondary processor 610 uses one or more lighting models and the vertex data to generate lit vertex color data, which the secondary processor 610 stores in the post-transform buffer 606, at a location identified using the information contained in the command stream 216B.

In the non-synchronization mode, the model view transform module 604 writes the color data to the post-transform buffer 606. However, if transform module 604 were to write the color data to the post-transform buffer 606, the transform module 604 could overwrite the lit color data written to buffer 606 by the secondary processor 610. In synchronization mode, the model view transform module 604 receives notification, e.g., notification from SPIM 214, to not transfer color data to the post-transform buffer 606. By foregoing the transfer of the color data as part of the vertex data written to the post-transform buffer 606 by the model view transform module 604, the transform module 604 avoids overwriting the lit color data written to the post-transform buffer 606 by the secondary processor 610.

In synchronization mode, SPIM 214 can provide a status of the data stored in post-transform buffer 606, so that the viewport transform module 608 retrieves vertex data that includes the lit color data output by the secondary processor 610. By way of a non-limiting example, SPMM 202 and SPIM 214 can monitor the feedback 216A to identify whether the secondary processor 610 has processed the vertices associated with primitives that the viewport transform module 608 is to process, so that module 608 processes vertex data that includes lit color data. For example, a command can include information that associates a command with the primitive list whose vertices are being processed by the command. In accordance with one or more embodiments, there is a one-to-one correspondence between a command and an associated primitive list, such that one command is used by the secondary processor 610 to process all of the primitives in the associated primitive list. Thus, once processing is determined to be complete for a given a command, the primitives in the associated primitive list are available to be processed by the viewport transform module 608.

In accordance with one or more embodiments, each command is given an identifier, and command identifiers are assigned in sequential order. In so doing, it is possible to determine whether processing for a given command is completed based on the last command identifier 802 information contained in feedback 216A. For example, commands that have a command identifier value that is equal to or less than the value identified in the last command ID 802 are considered to be completed by the secondary processor 610, while commands that have a command ID value greater than the last command ID 802 value are considered to be unfinished by the secondary processor 610.

Figure 9:
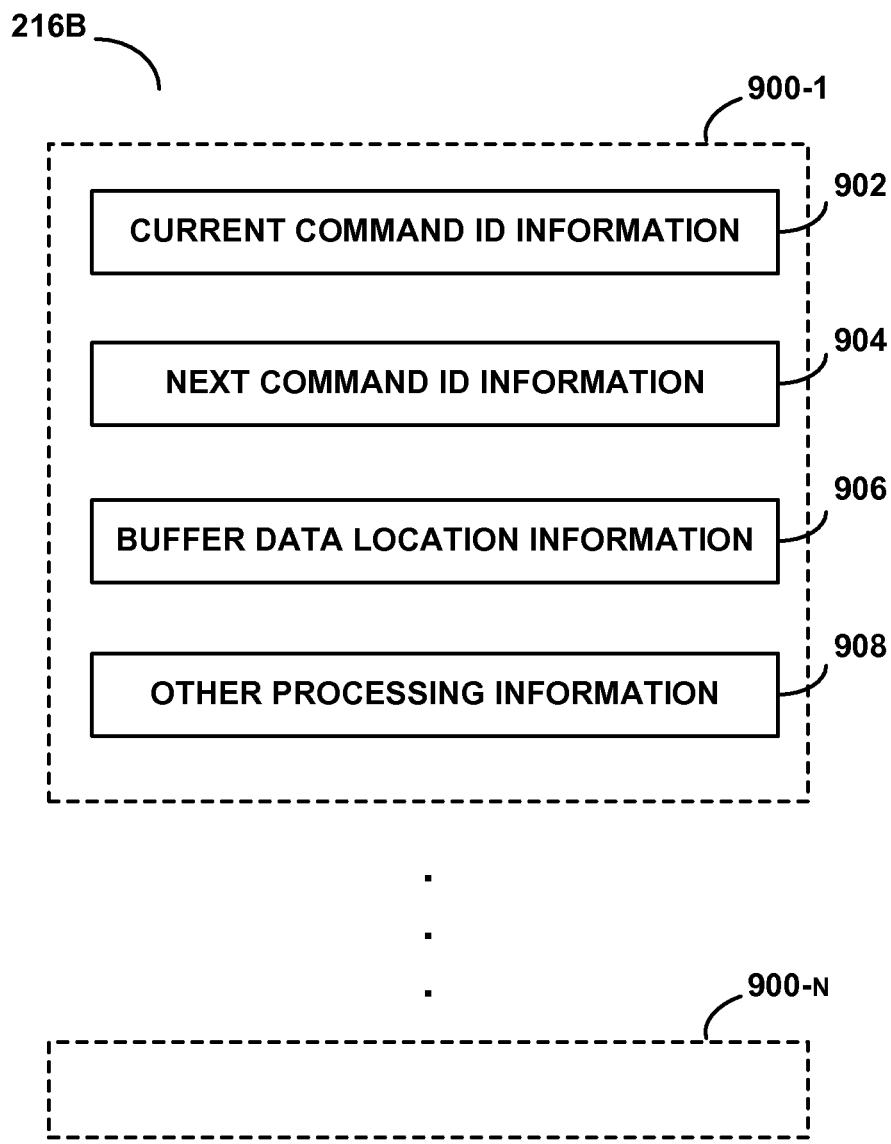
FIG. 9 illustrates exemplary contents of a command stream and the one or more commands included in a command stream in accordance with one or more embodiments of the present disclosure.

FIG. 9 illustrates exemplary contents of a command stream and the one or more commands included in a command stream in accordance with one or more embodiments of the present disclosure. Command stream 216B comprises one or more commands 900. Each command 900 comprises one or more information items of the command 900. The following provides a non-limiting example of contents of a command 900 in a command stream, which includes information for use with program code configured to operate on vertices, such as lighting or skinning program code. It should be apparent that other information can be added or used to replace the information discussed below, which information can be adapted to interoperate with any program code used by a secondary processor in accordance with one or more embodiments of the present disclosure.

Information item(s) 902 and 904 comprise identification information for use with the current command 900. In accordance with one or more embodiments, the following information can be used to facilitate secondary processing management and control. The following provides examples of such information items:

timestamp: Identifies the current command that is being processed by the secondary processor. SPIM 208A can output this timestamp in feedback 213A to indicate that the secondary processor is currently processing this command, for example.

primitiveTimeStamp: the variable comprises a timestamp for use in identifying the primitive list that corresponds to the current command 900. The value of the primitive timestamp can be used to map a command 900 to a given primitive, for example. The primitive timestamp can be ignored by the secondary processor.

Granularity: An optional variable for use in accordance with one or more embodiments. The granularity variable indicates a number of vertices associated with command 900 that comprise a vertex group, or subset of the vertices associated with command 900. In accordance with one or more embodiments, the secondary processor outputs information, as feedback, to indicate that a number of vertices that comprise a vertex group have been processed. In a case that command 900 processes vertices, the granularity instructs the SPIM 208A to provide feedback upon completion of a number of the vertices, e.g., a vertex group, which is a subset of the vertices associated with command 900. Using the granularity value, the SPIM 208A can provide feedback as each vertex group is processed, which feedback can be in addition to the feedback provided by SPIM 208A when the secondary processor completes processing all of the vertices associated with command 900, thus providing additional, and/or a finer level of, feedback.

vertexCount: A variable that comprises a value indicating a number of vertices to be processed in connection with the current command 900.

nextCommandGroupSize: This variable identifies the size of the next command. If there is no next, linked command, the variable can be set to zero. Otherwise, the value comprises a value that reflects the number of bytes contained in the next command.

nextCommandGroupPtr: This variable comprises all or a portion of next command ID information 904, which can comprise a pointer to the next command in command stream 216B. If there is no next command, the value can be set to a NULL value. Otherwise, the value comprises a pointer to a memory location that corresponds to the initial storage location, e.g., in command stream 216B, of the next command.

Information items 906 comprise information, e.g., pointers and strides, that can be used to locate stored data, e.g., data stored in data buffer(s) 216C. The following provides examples of such information items:

vertexInPtr: A variable that comprises a pointer to a buffer that contains input vertex positions. In accordance with one or more embodiments, the value of this variable can be NULL. By way of a non-limiting example, a lighting program being executed by the secondary processor may use normals, instead of positional information, associated with vertices in a case that processing involves an infinite lighting model. In a case that the processing involves one or more of a spotlighting or positional lighting models, the vertexInPtr can be used as a pointer to storage that stores positional data for the one or more vertices to be processed.

vertexOutPtr: A variable that comprises a pointer to a buffer into which the secondary processor can write skinned vertices. The vertexOutPtr variable is used in a case that the secondary processor performs skinning.

colorsInPtr: A variable that comprises a pointer to a buffer that stores vertex colors (RGBA). Each set of red, green, blue and alpha value set comprises a vertex color group. In a case that two-sided lighting is performed, the buffer stores two vertex color groups in succession in the buffer. Each vertex color group is separated by vertexOutSize bytes., such that the next vertex color group can be located by adding the value of the vertexOutSize variable to a current colorsInPtr value. If the colorsInPtr variable has a NULL value, a Material data structure is used as the input color group for each vertex.

colorsOutPtr: A variable that comprises a pointer to a buffer that stores the color output generated by the secondary processor. Two color groups are output in succession by the secondary processor for each vertex in a case that two sided lighting is enabled. Each vertex color group is separated by vertexOutSize bytes.

normalsInPtr: A variable that comprises a pointer to a buffer that contains vertex normals corresponding to the vertices pointed to by the vertexInPtr, e.g., the vertices that are currently being processed by the secondary processor. If the normalsInPtr variable has a NULL value, the secondary processor uses a CurrentNormal for all vertices.

boneIndicesPtr: A variable that comprises a pointer to an array of bytes that index the matrix palette for use in skinning vertices. By way of a non-limiting example, the number of indices equals the number of vertices times the number of bones per vertex, e.g., as indicated by a boneCount variable.

boneWeightsPtr: A variable that points to a buffer that contains s15.16 bone weights that can be used during a vertex skinning process. By way of a non-limiting example, the number of weights equals the number of vertices times the number of bones per vertex, e.g., as indicated by a boneCount variable.

vertexInSize: A variable that indicates a number of bytes contained in one input vertex structure (per vertex). By way of a non-limiting example, the value associated with this variable can be used as a stride to calculate a next vertex position in the vertex buffer.

vertexOutAndColorSize: A variable that identifies a number of bytes contained in one output vertex structure (per vertex). By way of a non-limiting example, the value associated with this variable can be used as a stride to calculate a next output position for either positions or colors.

numDimensions: A variable specifying a number of elements per position vector (3=XYZ), (4=XYZW). If the number is 3, W can be assumed to be 1.0. By way of a non-limiting example, the value associated with this variable can be used as a stride to calculate a pointer to the positional data for the next vertex.

Information items 908 comprise other processing information that can be used in secondary processing. The following provides examples of such information items:

CurrentNormal (XYZ): A variable that contains the normal to be used in a case that normalsInPtr is a NULL pointer value. This normal is applied to all vertices referenced in the command stream.

rescaleNormalsFlag: A variable that indicates whether or not to rescale the vertex normals. If the flag is set (e.g., to a value of 0xFFFFFFFF), the secondary processor rescales the vertex normals before the lighting equation, per the OpenGL-ES Specification (section 2.11.3).

RescaleNormalizeFlag: A variable that indicates when to rescale the vertex normals. If the first significant bit, e.g., bit 0, is set, the secondary processor normalizes the normals after transformation but before lighting as specified in the OpenGL-ES Specification (section 2.11.3). If bit 1 is set, the secondary processor can use the rescale normal algorithm as stated in the OpenGL specification or use the standard normalize in all cases. Since normalize can be used in all cases, bit 0 can be set whenever it is appropriate to normalize the normals, and bit 1 can also be set when the secondary processor is permitted to use rescale normals as an alternative.

twoSidedLightingFlag: A variable that indicates whether or not to perform two-sided lighting. If the flag is set (e.g., to a value of 0xFFFFFFFF), the secondary processor computes two colors per vertex, one for each side of the vertex (relative to the normal). In accordance with one or more embodiments, the twoSidedLightingFlag can be used to indicate that there are multiple colors, e.g., one for each side, associated with a vertex.

lightingEnabledFlag: A variable used to indicate whether or not to perform lighting. If the flag is set (e.g., to a value of 0xFFFFFFFF), the secondary processor runs the lighting calculation on the vertices and outputs one or two colors per vertex, depending on whether or not the twoSidedLighting flag is enabled. In accordance with one or more embodiments, the lightingEnabledFlag can be used in a case that lighting is optionally performed during secondary processing that performs multiple operations, e.g., lighting and skinning.

numActiveLights: A variable that specifies a number of lights to be applied per vertex. In accordance with one or more embodiments, up to 8 lights are supported, and active lights are in numerical order. (e.g. 3 active lights refer to lights 0, 1, 2).

numLightsUpdated: A variable tht specifies a number of lighting information arrays pointed to by the lightingInfoPtr variable value. In accordance with one or more embodiments, a light information array sent with a command is to be updated before the lighting calculation is performed on vertices for the current command, and any active light that is not updated uses its previous values.

lightUpdateMask: A variable that comprises bit fields that indicate which lights are to be updated using the lightingInfoArrayPtr. The number of bits set corresponds to the numLightsUpdated entry. The least significant bit corresponds to light 0, and bit 7 corresponds to light 7. If the most significant bit is set (0x8000), there is an updated material structure for the current command.

Material: A data structure that can be used, if needed, to update lighting model data, if the such data was updated. The presence of this structure can be identified by setting the value of the most significant byte of the lightUpdateMask variable. An example of a material data structure definition is provided below.

UpdatedLights: A data structure that comprises (if needed) a number, e.g., numLightsUpdated, of lighting information structures, each of which comprises the new data for lights that have changed since the last command. In accordance with one or more embodiments, the secondary processing uses the lightUpdateMask variable to map the light structures to the actual lights being updated.

boneCount: A variable that comprises a number of bones per vertex to be used in skinning. In accordance with one or more embodiments, if the value is equal to 0 (zero), the secondary processor applies matrix palette[0], which comprises the MVT, but does not output the transformed vertices in this case, e.g., so that the eye space vertices are used for the lighting calculation only.

matrixPalettePtr—A variable that comprises a pointer to a buffer of 4×4 fixed point matrices containing the matrix palette entries changes since the last CCG. A size of this buffer is indicated by the includedMatricesSize entry and the index map is contained in the MPInUse bit masks.

includedMatricesSize: A variable that indicates a size in bytes of matrix palettes pointed to by the matrixPalettePtr. In accordance with one or more embodiments, the buffer need only include updated matrices, and fields in the MPInUse mask variable are used to determine an appropriate index location at which to copy the data.

MPInUse0-15: A 16-bit mask, in which each bit set corresponds to an updated matrix palette that is included in the buffer pointed to by the matrixPalettePtr variable. The least significant bit corresponds to matrix index 0, while the most significant bit corresponds to matrix index 15, for example.

MPInUse16-31: A 16-bit mask in which each bit set corresponds to an updated matrix palette that is included in the buffer pointed to by the matrixPalettePtr. The least significant bit corresponds to matrix index 16, while the most significant bit corresponds to matrix index 31, for example.

MPInUse32-47: A 16-bit mask in which each bit set corresponds to an updated matrix palette that is included in the buffer pointed at by the matrixPalettePtr. The least significant bit corresponds to matrix index 32, while the most significant bit corresponds to matrix index 47, for example.

The following provides an example of contents of material data structures that can be used by the secondary processing, e.g., lighting, performed in accordance with one or more embodiments of the present disclosure:

Light Model Ambient Scene Color (RGBA)—Comprises an Ambient Scene color set that can be used for the lighting model.

Material Emissive (RGBA)—Comprises a fixed point RGBA color set that can be used for the Material Emissive color.

Material Ambient (RGBA)—Comprises a fixed point RGBA color set that can be used for the Material Ambient color.

Material Diffuse (RGBA)—Comprises a fixed point RGBA color set that can be used for the Material Diffuse color.

Material Specular (RGBA)—Comprises a fixed point RGBA color set that can be used for the Material Specular color.

Material Specular Exponent—Comprises a fixed point Material Specular Exponent factor, which can range between 0.0 and 128.0

The following provides additional examples of a data structure, e.g., light model data structure, which can be used by the secondary processing in accordance with one or more embodiments. By way of a non-limiting example, a light model data structure can exist for each light model used in lighting performed in secondary processing.

Ambient (RGBA)—Comprises fixed point values for an Ambient Light Component.

Spotlight Vector(XYZ)—Comprises a spotlight direction vector, if a spotlight is used.

Diffuse(RGBA)—Comprises fixed point values for a Diffuse Component.

Specular (RGBA)—Comprises fixed point values for a Specular Component.

Spotlight Cutoff Cosine—Comprises a cosine cutoff value for a spotlight. For example, the cosine values can range from 1.0 to 0.0 (0 degrees to 90 degrees) or −1 (180 degrees). In a special case of −1 (180 degrees), the light is an omnidirectional light and not a spotlight.

Spotlight Exponent—Comprises a fixed point Spotlight Exponent, if a spotlight is used.

Light Position (XYZW)—Comprises a fixed point light position or direction. If the value of the W component is 0 then the light is an infinite directional light, otherwise it is a positional light. If W is zero Attenuation and Spotlight values can be ignored.

Attenuation Factor (Constant)—Comprises a constant value for an attenuation factor Attenuation Factor (Linear)—Comprises a linear component of an attenuation factor Attenuation Factor (Quadratic)—Comprises a quadratic component of an attenuation factor.

Embodiments of the present disclosure provide a system, method and apparatus, in which a secondary processor unit is configured to operate on graphics pipeline data, with the output from secondary processor being integrated into the graphics pipeline such that the output is made available to one or more modules executing in the graphics pipeline. In accordance with such embodiments, a determination is made whether or not to use the secondary processor, and in a case that the secondary processor is to be used, a command stream, which can comprise one or more commands, is provided to the secondary processor. The secondary processing uses information contained in the command stream and operates on buffered graphics pipeline data in synchronization with one or more graphics pipeline processing modules, so that neither the secondary processor's processing module nor any graphics pipeline processing module overwrites data. An SPMM operates in combination with one or more SPIMs to synchronize data access by the secondary processing and the graphics pipeline processing modules using feedback information comprising a processing status of the secondary processing module.

In so doing, embodiments of the present disclosure provide an ability to balance the processing load using available secondary processor(s). A secondary processor that might otherwise remain idle can be used to facilitate graphics pipeline processing performed by a graphics processing unit and/or processing performed by a central processing unit, or other processing unit. Thus, for example, operations that may otherwise wait for a processing resource can be directed to an available secondary processor, which results in faster throughput. Advantageously, it has been determined that there is an increase in throughput, e.g., as measured in frames per second, using a secondary processor over processing in which the secondary processor is not used. In addition, embodiments of the present disclosure can use information fed back from the secondary processing to perform load balancing. The feedback can be used, for example, to determine when a secondary processor has reached a certain, threshold processing level. When the secondary processor is determined to reach a threshold processing capacity, processing can be directed to another processing unit, such as a central processing unit.

In addition, embodiments of the present disclosure provide an ability to make use of a processing unit for other than its primary processing purpose, to perform one or more other secondary functions if such processing unit is available. Use of such hardware, e.g., a processing unit, that might otherwise be idle results in more efficient use of the hardware.

In one or more exemplary embodiments, the functions described can be implemented in hardware, software, and/or firmware, or any combination thereof. If implemented in hardware, the functions can be implemented in one or more microprocessors, microcontrollers, digital signal processors (DSPs), application specific integrated circuits (ASICs), field programmable gate arrays (FPGAs), or the like. Such components can reside within a communication system, data writing and/or reading system, or other systems. If implemented in software, the functions can be stored on or transmitted over as one or more instructions or code on a computer-readable medium. Computer-readable media includes tangible computer storage media and communication media including any medium that facilitates transfer of a computer program from one place to another. A storage media can be any available media that can be accessed by a computer. By way of example, and not limitation, such computer-readable media can comprise RAM, Flash memory, read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. The term "computer-readable medium" can also be defined as a tangible computer program product. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   in response to a draw request, determining whether or not a processing unit, other than any graphics processing unit, is available to perform a secondary processing function to assist in graphics pipeline processing, the processing unit processing data outside of a graphics pipeline and having a primary processing function that is different from the secondary processing function;
   requesting allocation of the processing unit to perform the secondary processing function that is different than the primary processing function of the processing unit to assist in the graphics pipeline processing, wherein the secondary processing function is optional for the processing unit and comprises processing graphics pipeline data of the graphics pipeline outside of the graphics pipeline;
   determining whether or not the processing unit is performing the primary processing function;
   in a case that the allocation request is successful when the processing unit is not performing the primary processing function:
      allocating the processing unit in a case that the processing unit is at least not performing the primary processing function that is different from the secondary processing function;
      making the graphics pipeline data available to the processing unit;
      monitoring a processing status of the processing unit;
      integrating data output by the processing unit into the graphics pipeline data using the processing status; and
   in a case that the allocation request is unsuccessful, processing the draw request without using the processing unit to perform the secondary processing function.

2. The method of claim 1, wherein the processing unit comprises a digital signal processor and the secondary processing function comprises one or more lighting functions.

3. The method of claim 1, wherein the processing unit comprises a digital signal processor and the secondary processing function comprises one or more skinning functions.

4. The method of claim 1, further comprising:
   in the case that the allocation request is successful, generating a command stream to communicate information to be used by the processing unit.

5. The method of claim 1, wherein said integrating data output by the processing unit into the graphics pipeline data comprises:
   identifying a data dependency involving the processing unit and one or more graphics pipeline processing modules;
   determining using the processing status whether the processing unit is finished processing dependent data involved in the data dependency; and
   until the processing unit is finished processing the dependent data, causing the one or more graphics pipeline processing modules to wait for the dependent data.

6. The method of claim 1, wherein in the case that the allocation is unsuccessful, processing the draw request without using the processing unit comprises using the graphics processing unit to perform the secondary processing function.

7. An apparatus comprising:
   a graphics processing unit configured to implement a graphics pipeline;
   a processing unit, other than any graphics processing unit;
   a secondary processing manager coupled to said graphics processing unit and said processing unit, said secondary processing manager configured to:
      determine whether or not said processing unit is available to perform a secondary function to assist in graphics pipeline processing, said processing unit processing data outside of the graphics pipeline and having a primary processing function that is different from the secondary processing function;
      request allocation of said processing unit to perform the secondary processing function that is different than the primary processing function of said processing unit to assist in the graphics pipeline processing, wherein the secondary processing function is optional for said processing unit and comprises processing graphics pipeline data of the graphics pipeline outside of the graphics pipeline;
      determine whether or not the processing unit is performing the primary processing function;
      in a case that the allocation request is successful when the processing unit is not performing the primary processing function, said secondary processing manager is further configured to:
         allocate the processing unit in a case that the processing unit is at least not performing the primary processing function that is different from the secondary processing function;
         make the graphics pipeline data available to said processing unit;
         monitor a processing status of said processing unit;
         integrate data output by said processing unit into the graphics pipeline data using the processing status; and
      in a case that the allocation request is unsuccessful, the secondary processing manager is further configured to not use the processing unit to perform the secondary processing function.

8. The apparatus of claim 7, wherein said processing unit comprises a digital signal processor and the secondary processing function comprises one or more lighting functions.

9. The apparatus of claim 7, wherein said processing unit comprises a digital signal processor and the secondary processing function comprises one or more skinning functions.

10. The apparatus of claim 7, wherein in the case that the allocation request is successful, said secondary processing manager is further configured to:
  generate a command stream to communicate information to be used by said processing unit.

11. The apparatus of claim 7, wherein to integrate the data output by said processing unit into the graphics pipeline data, said secondary processing manager is configured to:
  identify a data dependency involving said processing unit and one or more graphics pipeline processing modules;
  determine using the processing status whether said processing unit is finished processing dependent data involved in the data dependency; and
  until said processing unit is finished processing the dependent data, causing said one or more graphics pipeline processing modules to wait for the dependent data.

12. A non-transitory computer-readable memory medium in which computer-executable program code is stored, the program code comprising code to:
  in response to a draw request, determine whether or not a processing unit, other than any graphics processing unit, is available to perform a secondary function to assist in graphics pipeline processing, the processing unit processing data outside of a graphics pipeline and having a primary processing function that is different from the secondary processing function;
  request allocation of the processing unit to perform the secondary processing function that is different than the primary processing function of the processing unit to assist in the graphics pipeline processing, wherein the secondary processing function is optional for the processing unit and comprises processing graphics pipeline data of the graphics pipeline outside of the graphics pipeline;
  determine whether or not the processing unit is performing the primary processing function;
  in a case that the allocation request is successful when the processing unit is not performing the primary processing function:
    allocate the processing unit in a case that the processing unit is at least not performing the primary processing function that is different from the secondary processing function;
    make the graphics pipeline data available to the processing unit;
    monitor a processing status of the processing unit;
    integrate data output by the processing unit into the graphics pipeline data using the processing status; and
  in a case that the allocation request is unsuccessful, process the draw request without using the processing unit to perform the secondary processing function.

13. The non-transitory computer-readable memory medium of claim 12, wherein the processing unit comprises a digital signal processor and the secondary processing function comprises one or more lighting functions.

14. The non-transitory computer-readable memory medium of claim 12, wherein the processing unit comprises a digital signal processor and the secondary processing function comprises one or more skinning functions.

15. The non-transitory computer-readable memory medium of claim 12, wherein the program code further comprises code to:
  in the case that the allocation request is successful, generate a command stream to communicate information to be used by the processing unit.

16. The non-transitory computer-readable memory medium of claim 12, wherein said code to integrate the data output by the processing unit into the graphics pipeline data comprises code to:
  identify a data dependency involving the processing unit and one or more graphics pipeline processing modules;
  determine using the processing status whether the processing unit is finished processing dependent data involved in the data dependency; and
  until the processing unit is finished processing the dependent data, cause the one or more graphics pipeline processing modules to wait for the dependent data.

17. An apparatus comprising:
  a graphics processing unit configured to implement a graphics pipeline;
  a processing unit, other than any graphics processing unit; and
  a secondary processing management means coupled to said graphics processing unit and said processing unit, said secondary processing management means comprising:
    means for determining whether or not the processing unit is available to perform a secondary function to assist in graphics pipeline processing, said processing unit processing data outside of the graphics pipeline and having a primary processing function that is different from the secondary processing function;
    means for requesting allocation of said processing unit to perform the secondary processing function that is different than the primary processing function of said processing unit to assist in the graphics pipeline processing, wherein the secondary processing function is optional for said processing unit and comprises processing graphics pipeline data of the graphics pipeline outside of the graphics pipeline;
    means for determining whether or not the processing unit is performing the primary processing function;
    in a case that the allocation request is successful when the processing unit is not performing the primary processing function, said secondary processing management means further comprising:
      means for allocating the processing unit in a case that the processing unit is at least not performing the primary processing function that is different from the secondary processing function;
      means for making the graphics pipeline data available to said processing unit;
      means for monitoring a processing status of said processing unit;
      means for integrating data output by said processing unit into the graphics pipeline data using the processing status; and
    in a case that the allocation request is unsuccessful, said secondary processing management means further configured to not use the processing unit to perform the secondary processing function.

18. The apparatus of claim 17, wherein said processing unit comprises a digital signal processor and the secondary processing function comprises one or more lighting functions.

19. The apparatus of claim 17, wherein said processing unit comprises a digital signal processor and the secondary processing function comprises one or more skinning functions.

20. The apparatus of claim 17, wherein in the case that the allocation request is successful, said secondary processing management means further comprises:
    means for generating a command stream to communicate information to be used by said processing unit.

21. The apparatus of claim 17, wherein said means for integrating the data output by said processing unit into the graphics pipeline data comprises:
    means for identifying a data dependency involving said processing unit and one or more graphics pipeline processing modules;
    means for determining using the processing status whether said processing unit is finished processing dependent data involved in the data dependency; and
    means for causing said one or more graphics pipeline processing modules to wait for the dependent data until said processing unit is finished processing the dependent data.

* * * * *